US012762990B2

(12) United States Patent
Wang et al.

(10) Patent No.: US 12,762,990 B2
(45) Date of Patent: Oct. 13, 2026

(54) OVER-CURRENT PROTECTION CIRCUIT AND DISPLAY PANEL

(71) Applicant: HKC CORPORATION LIMITED, Shenzhen (CN)

(72) Inventors: Yiran Wang, Shenzhen (CN); Jiawei Han, Shenzhen (CN); Shuang Chen, Shenzhen (CN); Jie Wang, Shenzhen (CN); Li Lv, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/293,410

(22) Filed: Aug. 7, 2025

(65) Prior Publication Data

US 2026/0045199 A1 Feb. 12, 2026

(30) Foreign Application Priority Data

Aug. 9, 2024 (CN) ........................ 202411091675.1

(51) Int. Cl.
*G09G 3/20* (2006.01)
*H02H 9/02* (2006.01)

(52) U.S. Cl.
CPC ........... *G09G 3/2092* (2013.01); *H02H 9/025* (2013.01); *G09G 2310/0267* (2013.01); *G09G 2330/023* (2013.01); *G09G 2330/025* (2013.01)

(58) Field of Classification Search
CPC ......... G09G 3/2092; G09G 2310/0267; G09G 2330/023; G09G 2330/025; H02H 9/025
See application file for complete search history.

(56) References Cited

U.S. PATENT DOCUMENTS

2005/0264510 A1 12/2005 Simatani
2018/0308448 A1* 10/2018 Lee .......................... H03K 5/24
2019/0027217 A1 1/2019 Strachan et al.
(Continued)

FOREIGN PATENT DOCUMENTS

CN 1702729 11/2005
CN 108431895 8/2018
CN 113364430 9/2021
(Continued)

OTHER PUBLICATIONS

CNIPA, First Office Action for CN Application No. 202411091675.1, Oct. 11, 2024.

(Continued)

*Primary Examiner* — Lixi C Simpson
(74) *Attorney, Agent, or Firm* — Hodgson Russ LLP

(57) ABSTRACT

An over-current protection circuit includes a current comparison module, a discharge control module, and a variable resistance module. The current comparison module is connected to a reference power supply and a target line. The discharge control module includes a first transistor. The control end of the first transistor is connected to the output end of the current comparison module, the first end and the second end of the first transistor are connected to the target line and the variable resistance module, respectively. The variable resistance module has at least a high-resistance state and a low-resistance state. The over-current protection circuit is used to protect the GOA signal line of the display panel.

16 Claims, 1 Drawing Sheet

(56) References Cited

U.S. PATENT DOCUMENTS

| | | | | |
|---|---|---|---|---|
| 2021/0183289 | A1* | 6/2021 | Kang | G09G 3/2092 |
| 2024/0242658 | A1* | 7/2024 | Zhou | G09G 3/36 |

FOREIGN PATENT DOCUMENTS

| | | |
|---|---|---|
| CN | 115694506 | 2/2023 |
| CN | 115953990 | 4/2023 |
| CN | 116964659 | 10/2023 |

OTHER PUBLICATIONS

CNIPA, Second Office Action for CN Application No. 202411091675.1, Oct. 23, 2024.

CNIPA, Notification to Grant Patent Right for Invention for CN Application No. 202411091675.1, Jan. 6, 2025.

* cited by examiner

OVER-CURRENT PROTECTION CIRCUIT AND DISPLAY PANEL

CROSS-REFERENCE TO RELATED APPLICATIONS

The present application claims priority to Chinese Patent Application No. 202411091675.1, filed on Aug. 9, 2024, the entire disclosure of which is hereby incorporated herein by reference.

TECHNICAL FIELD

The present application relates to the technical field of display, and particularly to an over-current protection circuit and a display panel.

BACKGROUND

Display panels include liquid crystal display (LCD) panels and organic light-emitting diode (OLED) display panels, etc. The display panel includes multiple rows of scan lines, multiple columns of data lines, and multiple pixel units. The pixel units correspond one-to-one with the intersections of the scan lines and data lines and are connected to the scan line of the corresponding row and the data line of the corresponding column.

The display panel also includes a gate driver circuit for driving the pixel array. The gate driver circuit includes a gate driver on array (GOA) circuit. When the gate driver circuit provides a scan signal on the corresponding scan line, all the transistors connected to that scan line are switched to the on-state, such that each pixel unit on that scan line receives display signals from the data line it is connected to, thereby enabling the pixel array to display an image.

When the display panel is in a normal operating state, the current value of the gate driver circuit is relatively small. However, when the display panel is in an abnormal operating state, or it is interfered with by the external environment (such as static electricity), or there is a short-circuit in the gate driver circuit lines, a large current will be generated in the gate driver circuit. This large current can impact the lines of the display panel, causing abnormal voltage output and damaging the lines and circuit components. Consequently, various faults such as horizontal stripes, crosstalk, screen flickering, and black screens may occur in the display panel, the display quality is reduced.

SUMMARY

There are provided an over-current protection circuit and a display panel according to embodiments of the present application. The technical solution is as below.

According to a first aspect of embodiments of the present application, there is provided an over-current protection circuit, which includes:

- a current comparison module, where a first input end of the current comparison module is connected to a reference power supply, and a second input end of the current comparison module is connected to a target line;
- a discharge control module, including a first transistor, wherein a control end of the first transistor is connected to an output end of the current comparison module, and a first end of the first transistor is connected to the target line; and
- a variable resistance module, where a second end of the first transistor is connected to a ground end through the variable resistance module, and the variable resistance module has at least a high-resistance state and a low-resistance state;
- where when a current in the target line is greater than a current of the reference power supply, the variable resistance module is in the low-resistance state, and when the current in the target line is less than the current of the reference power supply, the variable resistance module is in the high-resistance state.

According to a second aspect of embodiments of the present application, there is provided a display panel, which includes:

- the over-current protection circuit;
- a gate driver on array (GOA) signal line, connected to the over-current protection circuit.

Other characteristics and advantages of the present application will become apparent through the following detailed description, or will be learned partially through the practice of the present application.

It should be understood that the above general description and the following detailed description are only exemplary and explanatory, and shall not limit the disclosure.

BRIEF DESCRIPTION OF THE DRAWINGS

The accompanying drawings here are incorporated into the specification and form a part of this specification, showing the embodiments that conform to the present application, and are used together with the specification to explain the principles of the present application. Obviously, the accompanying drawings in the following description are only some embodiments of the present application. For those skilled in the art, other accompanying drawings can be obtained based on these accompanying drawings without creative efforts.

DETAILED DESCRIPTION OF THE EMBODIMENTS

Now, the example embodiments will be described more comprehensively with reference to the accompanying drawings. However, the example embodiments can be implemented in various forms and should not be construed as being limited to the examples set forth herein. Instead, these embodiments are provided so that the present application will be more comprehensive and complete, and the concept of the example embodiments will be fully conveyed to those skilled in the art.

Moreover, the described features, structures, or characteristics can be combined in any suitable manner in one or more embodiments. In the following description, many specific details are provided to give a full understanding of the embodiments of the present application. However, those skilled in the art will realize that the technical solutions of the present application can be practiced without one or more of the specific details, or other methods, components, devices, steps, etc. can be adopted. In other cases, well-known methods, devices, implementations, or operations are not shown or described in detail to avoid obscuring various aspects of the present application.

Hereinafter, the present application will be further described in detail with reference to the accompanying drawings and specific embodiments. It should be noted here that the technical features involved in the various embodiments of the present application described below can be combined with each other as long as they do not conflict with each other. The embodiments described below with reference to the accompanying drawings are exemplary and are intended to explain the present application, and should not be construed as a limitation to the present application.

The First Embodiment

Figure 1:
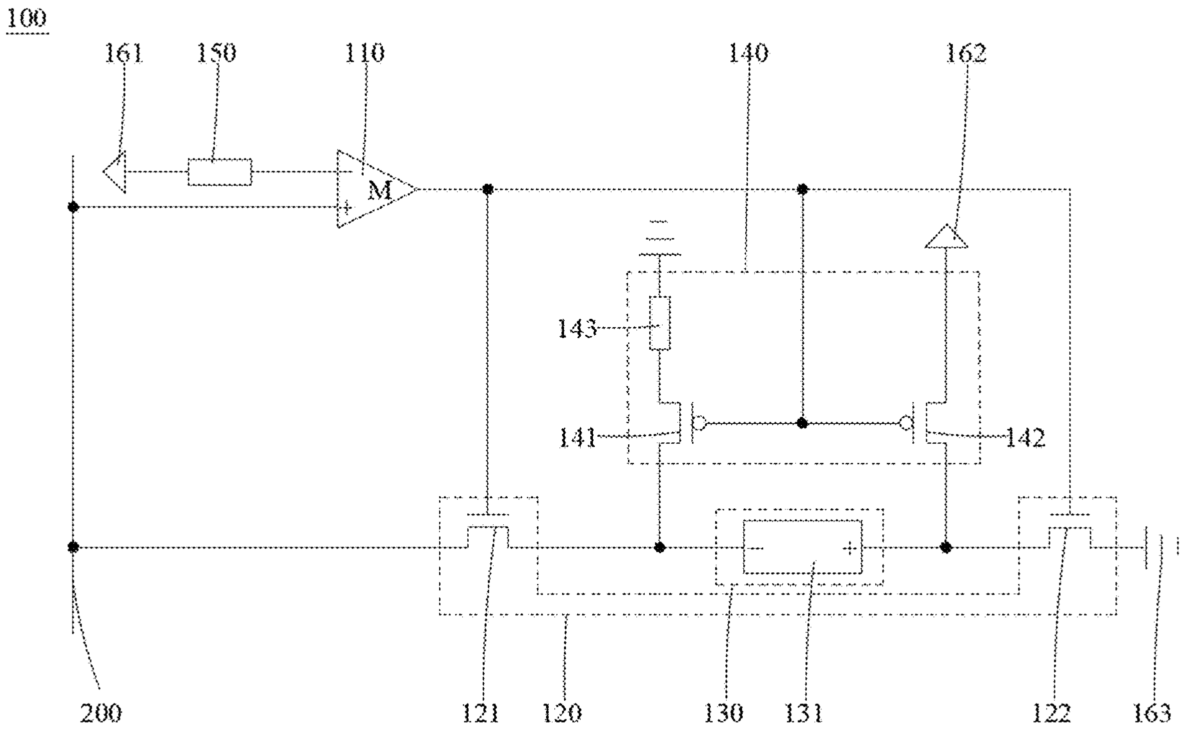
FIG. 1 is a schematic structural view of the over-current protection circuit in the first embodiment of the present application.

Referring to FIG. 1, in this embodiment, the over-current protection circuit 100 includes a current comparison module 110, a discharge control module 120, and a variable resistance module 130. The first input end of the current comparison module 110 is connected to a reference power supply 161, and the second input end of the current comparison module 110 is connected to a target line 200. The discharge control module 120 includes a first transistor 121. The control end of the first transistor 121 is connected to the output end of the current comparison module 110, the first end of the first transistor 121 is connected to the target line 200, and the second end of the first transistor 121 is connected to the ground end 163 through the variable resistance module 130.

The resistance value of the variable resistance module 130 can be switched. The variable resistance module 130 has a high-resistance state and a low-resistance state at least. When the current in the target line 200 is greater than the current output by the reference power supply 161, the variable resistance module 130 is in the low-resistance state. When the current in the target line 200 is less than the current output by the reference power supply 161, the variable resistance module 130 is in the high-resistance state.

The over-current protection circuit 100 can be used to protect the gate driver on array (GOA) signal line, preventing too large current in the GOA signal line from impacting the lines of the display panel and causing damage to the lines and circuit components. The GOA signal lines include the clock signal line (CK), the low-frequency clock signal line (LC), the frame start signal line (STV), the reset signal line (Reset), the high-level signal line (VGH), and the low-level signal line (VGL). The clock signal line, the low-frequency clock signal line, the frame start signal line, and the reset signal line are connected to the level shift chip IC, and the high-level signal line (VGH) and the low-level signal line (VGL) are connected to the power management integrated circuits.

The over-current protection circuit 100 is used to protect the GOA signal line, that is, the target line 200 is the GOA signal line. When the current in the target line 200 is greater than the current output by the reference power supply 161, the output end of the current comparison module 110 outputs a control signal to turn on the first transistor 121 and switch the variable resistance module 130 to the low-resistance state. The large current in the target line 200 is released to the ground end 163 through the first transistor 121 and the variable resistance module 130. Therefore, it can prevent the excessive current in the GOA signal line from impacting the lines of the display panel and causing damage to the lines and circuit components.

When the current in the target line 200 is less than the current output by the reference power supply 161, the output end of the current comparison module 110 outputs a control signal to turn off the first transistor 121 and switch the variable resistance module 130 to the high-resistance state. If the variable resistance module 130 is always in the low-resistance state, even when the first transistor 121 is in the off-state, there will inevitably be leakage current. The current in the GOA signal line will be released to the ground end 163 through the first transistor 121 and the variable resistance module 130, thus affecting the GOA signal. The output end of the current comparison module 110 outputs a control signal to switch the variable resistance module 130 to the high-resistance state. The high-resistance state represents that the circuit is approximately cut off, which can effectively prevent the current in the GOA signal line from being released to the ground end 163 through the variable resistance module 130.

When the display panel is in an abnormal operating state, or it is interfered with by the external environment, or there is a short-circuit in the gate driver circuit lines, a large current will be generated in the gate driver circuit. This large current can impact the lines of the display panel, causing abnormal voltage output and damaging the lines and circuit components. Consequently, various faults such as horizontal stripes, crosstalk, screen flickering, and black screens may occur in the display panel, the display quality is reduced.

In this embodiment, the over-current protection circuit 100 includes a current comparison module 110, a discharge control module 120, and a variable resistance module 130. The first input end of the current comparison module 110 is connected to the reference power supply 161, and the second input end of the current comparison module 110 is connected to the target line 200. The discharge control module 120 includes the first transistor 121. The control end of the first transistor 121 is connected to the output end of the current comparison module 110, the first end of the first transistor 121 is connected to the target line 200, and the second end of the first transistor 121 is connected to the ground end 163 through the variable resistance module 130. The variable resistance module 130 has a high-resistance state and a low-resistance state at least. The over-current protection circuit 100 is used to protect the GOA signal line of the display panel. When the current in the target line 200 is greater than the current output by the reference power supply 161, the variable resistance module 130 is in the low-resistance state. The large current in the GOA signal line is released to the ground end 163 through the variable resistance module 130, which can prevent the excessive current in the GOA signal line from impacting the lines of the display panel and causing damage to the lines and circuit components.

In addition, when the variable resistance module 130 is in the high-resistance state, the high-resistance state represents that the circuit is approximately cut off, which can prevent the current in the GOA signal line from being released to the ground end 163 through the variable resistance module 130 due to the leakage current of the transistor when the current in the GOA signal line is at a normal level, thus affecting the GOA signal.

For example, the variable resistance module 130 includes a memristor 131. The resistance value of the memristor 131 can be switched. When the current flows from the positive electrode to the negative electrode of the memristor 131, the resistance value of the memristor 131 gradually increases, that is, the memristor 131 switches from the low-resistance state to the high-resistance state. When the current flows from the negative electrode to the positive electrode of the memristor 131, the resistance value of the memristor 131 gradually decreases, that is, the memristor 131 switches from the high-resistance state to the low-resistance state. The low-resistance state and the high-resistance state can be the minimum and maximum values within the variable resistance range of the memristor 131.

The negative electrode of the memristor 131 is connected to the second end of the first transistor 121. The discharge control module 120 further includes a second transistor 122. The control end of the second transistor 122 is connected to the output end of the current comparison module 110, the first end of the second transistor 122 is connected to the positive electrode of the memristor 131, and the second end of the second transistor 122 is connected to the ground end 163. Both the second transistor 122 and the first transistor 121 are P-channel transistors or both are N-channel transistors.

When the current in the target line 200 is greater than the current output by the reference power supply 161, the first transistor 121 and the second transistor 122 are turned on simultaneously. The current in the target line 200 flows through the first transistor 121, the positive and negative electrodes of the memristor 131, and then the second transistor 122 to the ground end 163. The memristor 131 switches from the high-resistance state to the low-resistance state. The over-current protection circuit 100 further includes a reset module 140. When the current in the target line 200 is less than the current output by the reference power supply 161, the first transistor 121 and the second transistor 122 are turned off simultaneously. The reset module 140 makes the current flow from the positive electrode of the memristor 131 to the negative electrode of the memristor 131, and the memristor 131 switches from the low-resistance state to the high-resistance state.

The variable resistance module 130 includes a memristor 131, and the resistance value of the memristor 131 can be switched, making the switching of the low-resistance state and the high-resistance state easier.

It should be noted that the variable resistance module 130 can include the memristor 131, but it is not limited to this. The variable resistance module 130 can also include multiple resistors or a varistor, depending on the specific situation. If the variable resistance module 130 includes multiple resistors, these multiple resistors include a small resistor and a large resistor connected in series. When the current in the target line 200 is greater than the current output by the reference power supply 161, the large resistor can be short-circuited to switch the variable resistance module 130 from the high-resistance state to the low-resistance state. When the current in the target line 200 is less than the current output by the reference power supply 161, the small resistor and the large resistor can be connected in series to switch the variable resistance module 130 from the low-resistance state to the high-resistance state. If the variable resistance module 130 includes a varistor, the resistance value of the varistor changes with the voltage. The voltage of the varistor can be adjusted to switch the low-resistance state and the high-resistance state.

In some embodiments, the positive electrode of the memristor 131 is directly or indirectly connected to a reset power supply 162. The reset module 140 includes a third transistor 141. The control end of the third transistor 141 is connected to the reset signal line, the first end of the third transistor 141 is connected to the negative electrode of the memristor 131, and the second end of the third transistor 141 is directly or indirectly connected to the ground end 163.

When the current in the target line 200 is greater than the current output by the reference power supply 161, the first transistor 121 and the second transistor 122 are turned on simultaneously. The signal on the reset signal line controls the third transistor 141 to turn off. The current in the target line 200 flows through the first transistor 121, the positive and negative electrodes of the memristor 131, and then the second transistor 122 to the ground end 163. The memristor 131 switches from the high-resistance state to the low-resistance state. And the reset power supply 162 is in communication with the ground end 163, and the current flows from the reset power supply 162 through the second transistor 122 to the ground end 163. When the current in the target line 200 is less than the current output by the reference power supply 161, the first transistor 121 and the second transistor 122 are turned off simultaneously. The signal on the reset signal line controls the third transistor 141 to turn on. The current flows from the reset power supply 162 through the positive and negative electrodes of the memristor 131, and the third transistor 141 to the ground end 163. The memristor 131 switches from the low-resistance state to the high-resistance state. When the variable resistance module 130 is in the high-resistance state, the high-resistance state represents the circuit is approximately cut off, which can reduce the energy consumption of the reset power supply 162.

In some embodiments, the reset module 140 further includes a fourth transistor 142. The control end of the fourth transistor 142 is connected to the reset signal line, the first end of the fourth transistor 142 is connected to the reset power supply 162, and the second end of the fourth transistor 142 is connected to the positive electrode of the memristor 131.

When the current in the target line 200 is greater than the current output by the reference power supply 161, the signal on the reset signal line controls the fourth transistor 142 to turn off, preventing the reset power supply 162 from being in communication with the ground end 163 and reducing the energy consumption of the reset power supply 162. When the current in the target line 200 is less than the current output by the reference power supply 161, the signal on the reset signal line controls the third transistor 141 and the fourth transistor 142 to turn on. The current flows from the reset power supply 162, the fourth transistor 142, the positive and negative electrodes of the memristor 131, and the third transistor 141 to the ground end 163. The memristor 131 switches from the low-resistance state to the high-resistance state.

In some embodiments, when the current in the target line 200 is greater than the current output by the reference power supply 161, the current comparison module 110 outputs a high-level signal. When the current in the target line 200 is less than the current output by the reference power supply 161, the current comparison module 110 outputs a low-level signal. The first transistor 121 and the second transistor 122 can both be N-channel transistors, and the third transistor 141 and the fourth transistor 142 can both be P-channel transistors. The reset signal line is connected to the output end of the current comparison module 110.

Since one of the transistors in the discharge control module 120 and one of the transistors in the reset module 140 are turned on and the other of the transistors in the discharge control module 120 and the other of the transistors in the reset module 140 are turned off, and both the transistors in the discharge control module 120 and the transistors in the reset module 140 are connected to the output end of the current comparison module 110, one path of control signal for controlling the reset module 140 can be reduced.

It should be noted that the third transistor 141 and the fourth transistor 142 can both be P-channel transistors, but it is not limited to this. The third transistor 141 and the fourth transistor 142 can both be N-channel transistors, depending on the specific situation. If the third transistor 141 and the fourth transistor 142 are both N-channel transistors, the reset signal line is not connected to the output end of the current comparison module 110, but is controlled by a separate controller, depending on the specific situation.

If the first transistor 121, the second transistor 122, the third transistor 141, and the fourth transistor 142 are all N-channel transistors, the manufacturing cost of the over-current protection circuit 100 and the display panel can be reduced.

In some embodiments, the reset module 140 further includes a current-limiting resistor 143. The current-limiting resistor 143 is connected to the second end of the third transistor 141 and the ground end 163.

When the current in the target line 200 is less than the current output by the reference power supply 161, the third transistor 141 and the fourth transistor 142 are turned on. The current flows from the reset power supply 162 through the fourth transistor 142, the positive and negative electrodes of the memristor 131, the third transistor 141, and the current-limiting resistor 143 to the ground end 163. The current-limiting resistor 143 can limit the magnitude of the current and prevent the lines from being damaged due to excessive current.

In some embodiments, the current comparison module 110 includes a current comparator. The first input end of the current comparator is connected to the reference power supply 161, and the second input end of the current comparator is connected to the target line 200. When the current in the target line 200 is greater than the current output by the reference power supply 161, the current comparator outputs a high-level signal. When the current in the target line 200 is less than the current output by the reference power supply 161, the current comparator outputs a low-level signal.

It should be noted that the current comparison module 110 can be a current comparator, but it is not limited to this. The current comparison module 110 can also be a voltage comparator, depending on the specific situation. When the current comparison module 110 is a voltage comparator, the current in the target line 200 can be first converted into a voltage through a voltage-sampling resistor and then compared.

When the current comparison module 110 is a current comparator, it directly compares the current in the target line 200 with the current output by the reference power supply 161 and outputs a high-level signal or a low-level signal, making the structure of the circuit simpler.

In some embodiments, the reference power supply 161 is a voltage source. The over-current protection circuit 100 further includes a current-sampling resistor 150. The first input end of the current comparator is connected to the reference power supply 161 through the current-sampling resistor 150.

When the over-current protection circuit 100 is used in the display panel, the display panel has power supplies with a high-level signal line and a low-level signal line. The reference power supply 161 and the reset power supply 162 can use the existing power supplies of the display panel, thereby simplifying the structure of the over-current protection circuit 100.

It should be noted that some display panels also have a constant-current source. The reference power supply 161 can also be a constant-current source. When the over-current protection circuit 100 is used in the display panel, the reference power supply 161 can use the existing constant-current source of the display panel, thereby simplifying the structure of the over-current protection circuit 100.

The Second Embodiment

Figure 2:
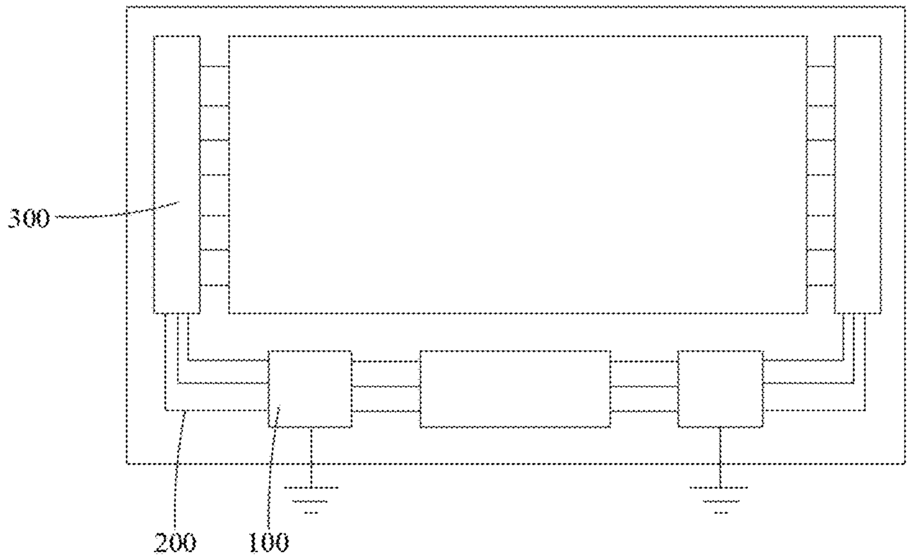
FIG. 2 is a schematic structural view of the display panel in the second embodiment of the present application.

Referring to FIG. 2, the display panel in this embodiment includes a display region. The display panel also includes a gate driver circuit 300, and the gate driver circuit 300 is arranged on at least one side of the display region. The gate driver circuit 300 includes a GOA circuit and an over-current protection circuit 100. The gate driver circuit 300 and the over-current protection circuit 100 are connected through a target line 200, and the target line 200 includes a GOA signal line.

The GOA signal lines include a clock signal line, a low-frequency clock signal line, a frame start signal line, a reset signal line, a high-level signal line, and a low-level signal line, etc. The clock signal line, the low-frequency clock signal line, the frame start signal line, and the reset signal line are connected to the level shift chip, and the high-level signal line and the low-level signal line are connected to the power management chip. The level shift chip or the power management chip can be arranged on the display panel or on the main board. In addition, the over-current protection circuit 100 can also be arranged on the main board.

It should be noted that the target line 200 may include a GOA signal line, that is, the over-current protection circuit 100 is used to protect the GOA signal line, but it is not limited to this. The over-current protection circuit 100 can also be used to protect other power supply lines or signal lines of the display panel, depending on the specific situation.

The display panel in this embodiment includes an over-current protection circuit 100. The over-current protection circuit 100 includes a current comparison module 110, a discharge control module 120, and a variable resistance module 130. The first input end of the current comparison module 110 is connected to a reference power supply 161, the second input end of the current comparison module 110 is connected to a target line 200, and the target line 200 includes a GOA signal line. The discharge control module 120 includes a first transistor 121. The control end of the first transistor 121 is connected to the output end of the current comparison module 110, the first end of the first transistor 121 is connected to the target line 200, and the second end of the first transistor 121 is connected to the ground end 163 through the variable resistance module 130. The variable resistance module 130 has at least a relatively high-resistance state and a relatively low-resistance state. The over-current protection circuit 100 is used to protect the GOA signal line of the display panel. When the current in the target line 200 is greater than the current output by the reference power supply 161, the variable resistance module 130 is in the low-resistance state. The large current of the GOA signal line is released to the ground end 163 through the variable resistance module 130, which can prevent the current in the GOA signal line from too larger, thereby impacting the lines of the display panel and causing damage to the lines and circuit components. When the variable resistance module 130 is in the high-resistance state, which represents the circuit is approximately cut off, which can prevent the current in the GOA signal line from being released to the ground end 163 through the variable resistance module 130 due to leakage current of the transistor when the current in the GOA signal line is at a normal level, thus affecting the GOA signal.

The terms "first", "second", etc. are only used for the purpose of description and cannot be understood as indicating or implying relative importance or implicitly specifying the number of indicated technical features. Thus, a feature defined with "first", "second", etc. may explicitly or implicitly include one or more of this feature. In the description of the present application, the meaning of "a plurality of" is two or more, unless otherwise specifically defined.

In the present application, unless otherwise clearly defined and limited, the terms "assembly", "connection", etc. should be understood in a broad sense. For example, it can be a fixed connection, a detachable connection, or an integrated body; it can be a mechanical connection or an electrical connection; it can be a direct connection or an indirect connection through an intermediate medium, and it can be the internal communication of two components or the interaction relationship between two components. For those skilled in the art, the specific meaning of the above terms in the present application can be understood according to the specific situation.

In the description of this specification, the description referring to the terms "some embodiments", "for example", etc. means that the specific features, structures, materials, or characteristics described in combination with the embodiment or example are included in at least one embodiment or example of the present application. In this specification, the schematic expressions of the above terms do not necessarily refer to the same embodiment or example. Moreover, the described specific features, structures, materials, or characteristics can be combined in a suitable way in any one or more embodiments or examples. In addition, without contradiction, those skilled in the art can combine and integrate the different embodiments or examples described in this specification and the features of different embodiments or examples.

Although the embodiments of the present application have been shown and described above, it can be understood that the above embodiments are exemplary and should not be construed as a limitation to the present application. Those skilled in the art can make changes, modifications, substitutions, and variations to the above embodiments within the scope of the present application. Therefore, any changes or modifications made according to the claims and the specification of the present application shall fall within the scope covered by the patent of the present application.

What is claimed is:

1. An over-current protection circuit, comprising:

a current comparison module, wherein a first input end of the current comparison module is connected to a reference power supply, and a second input end of the current comparison module is connected to a target line;

a discharge control module, comprising a first transistor, wherein a control end of the first transistor is connected to an output end of the current comparison module, and a first end of the first transistor is connected to the target line; and a variable resistance module, wherein a second end of the first transistor is connected to a ground end through the variable resistance module, and the variable resistance module has at least a high-resistance state and a low-resistance state;

wherein when a current in the target line is greater than a current of the reference power supply, the variable resistance module is in the low-resistance state, and when the current in the target line is less than the current of the reference power supply, the variable resistance module is in the high-resistance state;

wherein the variable resistance module comprises a memristor, a negative electrode of the memristor is connected to the second end of the first transistor;

wherein the discharge control module further comprises a second transistor, a control end of the second transistor is connected to the output end of the current comparison module, a first end of the second transistor is connected to a positive electrode of the memristor, and a second end of the second transistor is connected to the ground end;

when the current in the target line is greater than the current of the reference power supply, the current flows from the target line, the first transistor, the negative electrode of the memristor, the positive electrode and the negative electrode of the memristor, and the second transistor to the ground end; and wherein the over-current protection circuit further comprises a reset module, when the current in the target line is less than the current of the reference power supply, the reset module makes the current flow from the positive electrode of the memristor to the negative electrode of the memristor.

2. The over-current protection circuit according to claim 1, wherein the positive electrode of the memristor is directly or indirectly connected to a reset power supply; and the reset module comprises a third transistor, a control end of the third transistor is connected to a reset signal line, a first end of the third transistor is connected to the negative electrode of the memristor, and a second end of the third transistor is directly or indirectly connected to the ground end.

3. The over-current protection circuit according to claim 2, wherein the reset module further comprises a fourth transistor, a control end of the fourth transistor is connected to the reset signal line, a first end of the fourth transistor is connected to the reset power supply, and a second end of the fourth transistor is connected to the positive electrode of the memristor.

4. The over-current protection circuit according to claim 3, wherein the reset module further comprises a current-limiting resistor, and the current-limiting resistor is connected to the second end of the third transistor and the ground end.

5. The over-current protection circuit according to claim 3, wherein when the current in the target line is greater than the current of the reference power supply, the current comparison module outputs a high-level signal; and the first transistor and the second transistor are both N-channel transistors, the third transistor and the fourth transistor are both P-channel transistors, and the reset signal line is connected to the output end of the current comparison module.

6. The over-current protection circuit according to claim 3, wherein when the current in the target line is greater than the current of the reference power supply, the current comparison module outputs a high-level signal; and the first transistor, the second transistor, the third transistor, and the fourth transistor are all N-channel transistors.

7. The over-current protection circuit according to claim 3, wherein when the current in the target line is greater than the current of the reference power supply, the current comparison module outputs a high-level signal; and the current comparison module comprises a current comparator, a first input end of the current comparator is connected to the reference power supply, and a second input end of the current comparator is connected to the target line.

8. The over-current protection circuit according to claim 7, wherein the reference power supply is a constant-current source, and the first input end of the current comparator is connected to the constant-current source, or the reference power supply is a voltage source; and the over-current protection circuit further comprises a current-sampling resistor, and the first input end of the current comparator is connected to the reference power supply through the current-sampling resistor.

9. A display panel, comprising:

an over-current protection circuit; and a gate driver on array (GOA) signal line, connected to the over-current protection circuit;

wherein the over-current protection circuit comprises:

a current comparison module, wherein a first input end of the current comparison module is connected to a reference power supply, and a second input end of the current comparison module is connected to a target line;

a discharge control module, comprising a first transistor, wherein a control end of the first transistor is connected to an output end of the current comparison module, and a first end of the first transistor is connected to the target line; and a variable resistance module, wherein a second end of the first transistor is connected to a ground end through the variable resistance module, and the variable resistance module has at least a high-resistance state and a low-resistance state;

wherein when a current in the target line is greater than a current of the reference power supply, the variable resistance module is in the low-resistance state, and when the current in the target line is less than the current of the reference power supply, the variable resistance module is in the high-resistance state;

wherein the variable resistance module comprises a memristor, a negative electrode of the memristor is connected to the second end of the first transistor;

wherein the discharge control module further comprises a second transistor, a control end of the second transistor is connected to the output end of the current comparison module, a first end of the second transistor is connected to a positive electrode of the memristor, and a second end of the second transistor is connected to the ground end;

when the current in the target line is greater than the current of the reference power supply, the current flows from the target line, the first transistor, the negative electrode of the memristor, the positive electrode and the negative electrode of the memristor, and the second transistor to the ground end; and wherein the over-current protection circuit further comprises a reset module, when the current in the target line is less than the current of the reference power supply, the reset module makes the current flow from the positive electrode of the memristor to the negative electrode of the memristor.

10. The display panel according to claim 9, wherein the positive electrode of the memristor is directly or indirectly connected to a reset power supply; and the reset module comprises a third transistor, a control end of the third transistor is connected to a reset signal line, a first end of the third transistor is connected to the negative electrode of the memristor, and a second end of the third transistor is directly or indirectly connected to the ground end.

11. The display panel according to claim 10, wherein the reset module further comprises a fourth transistor, a control end of the fourth transistor is connected to the reset signal line, a first end of the fourth transistor is connected to the reset power supply, and a second end of the fourth transistor is connected to the positive electrode of the memristor.

12. The display panel according to claim 11, wherein the reset module further comprises a current-limiting resistor, and the current-limiting resistor is connected to the second end of the third transistor and the ground end.

13. The display panel according to claim 11, wherein when the current in the target line is greater than the current of the reference power supply, the current comparison module outputs a high-level signal; and the first transistor and the second transistor are both N-channel transistors, the third transistor and the fourth transistor are both P-channel transistors, and the reset signal line is connected to the output end of the current comparison module.

14. The display panel according to claim 13, wherein when the current in the target line is greater than the current of the reference power supply, the current comparison module outputs a high-level signal; and the first transistor, the second transistor, the third transistor, and the fourth transistor are all N-channel transistors.

15. The display panel according to claim 11, wherein when the current in the target line is greater than the current of the reference power supply, the current comparison module outputs a high-level signal; and the current comparison module comprises a current comparator, a first input end of the current comparator is connected to the reference power supply, and a second input end of the current comparator is connected to the target line.

16. The display panel according to claim 15, wherein the reference power supply is a constant-current source, and the first input end of the current comparator is connected to the constant-current source, or the reference power supply is a voltage source; and the over-current protection circuit further comprises a current-sampling resistor, and the first input end of the current comparator is connected to the reference power supply through the current-sampling resistor.

* * * * *